United States Patent [19]

Moon, Sr.

[11] Patent Number: 4,884,054

[45] Date of Patent: Nov. 28, 1989

[54] SELF-CONTAINED MOTOR VEHICLE MAINTENANCE INTERVAL MONITOR

[76] Inventor: John H. Moon, Sr., 3914 Peru Cir., Pasadena, Tex. 77504

[21] Appl. No.: 233,620

[22] Filed: Aug. 18, 1988

[51] Int. Cl.⁴ .......................... G08B 1/00; B60Q 1/00
[52] U.S. Cl. .............................. 340/309.15; 340/439; 340/457.4; 364/569; 364/551.01; 364/424.03; 73/112; 73/117.3
[58] Field of Search .............. 340/309.15, 52 D, 52 F, 340/52 R, 438, 439, 457, 457.4; 364/424, 550, 551, 569, 551.01, 424.03; 73/117.3, 112, 113, 114, 116

[56] References Cited

U.S. PATENT DOCUMENTS 4,031,363  6/1977  Freeman et al. ............... 235/92 FQ
4,159,531  6/1979  McGrath .......................... 364/424
4,307,291  12/1981  Gloviak et al. .
4,404,641  9/1983  Bazarnik .
4,739,482  4/1988  Wrigge .

Primary Examiner—Donnie L. Crosland
Attorney, Agent, or Firm—Pravel, Gambrell, Hewitt, Kimball & Krieger

[57] ABSTRACT

A vehicle maintenance interval monitor allows selection of mileage intervals between servicing for a number of individual maintenance requirements. The monitor is computerized and battery powered. The monitor keeps track of the actual date and time. The miles traveled are computed by determining a change in the actual date and time and multiplying this time by a speed factor. When a service interval has been completed the monitor provides a suitable warning indication.

18 Claims, 6 Drawing Sheets

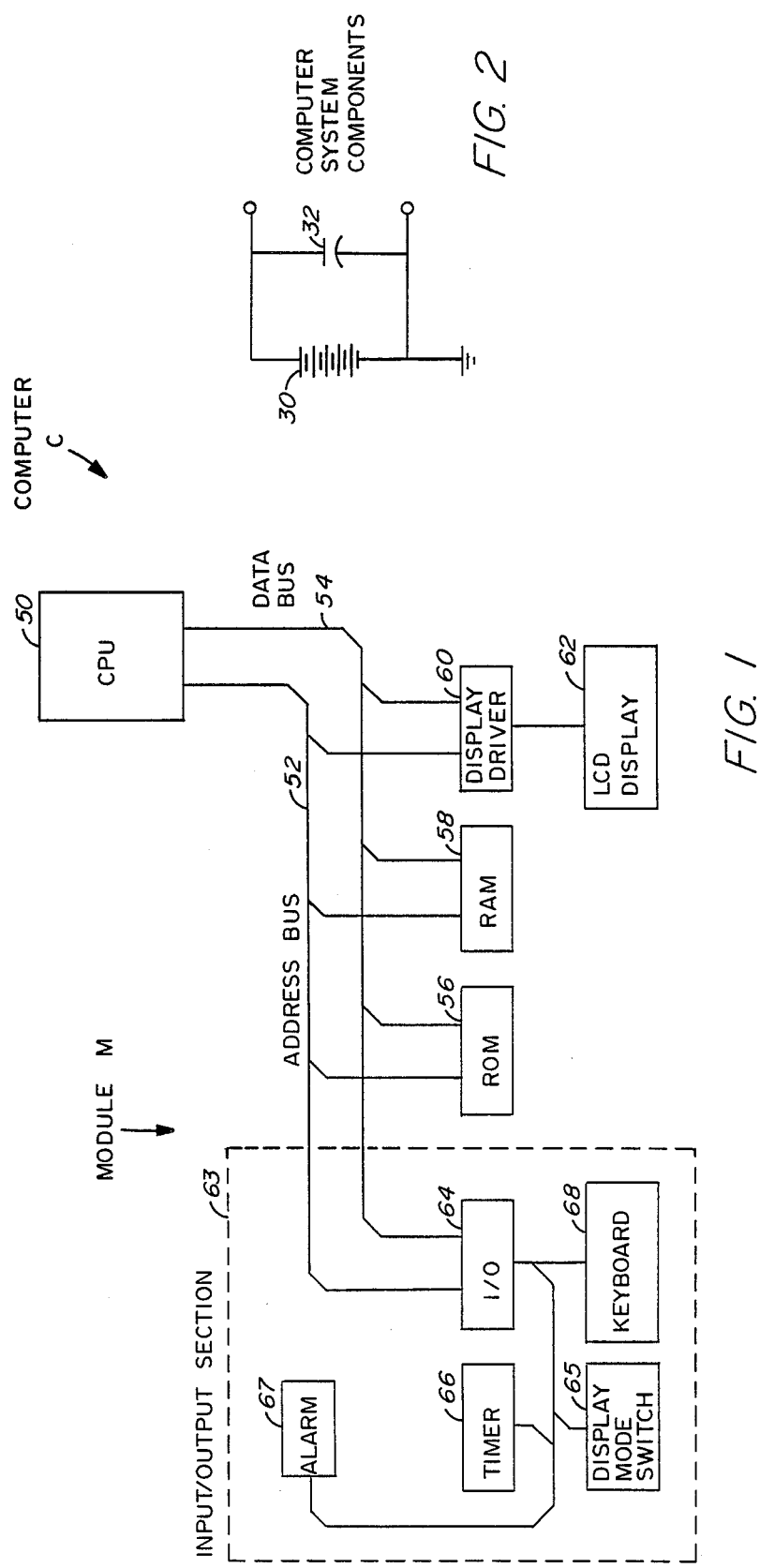

SELF-CONTAINED MOTOR VEHICLE MAINTENANCE INTERVAL MONITOR

BACKGROUND OF THE INVENTION

1. Field of the Invention

The invention relates to maintenance interval monitor, especially those designed for use with motor vehicles.

2. Description of the Prior Art

The maintenance of a modern motor vehicle is very important because of the constantly increasing cost of a new vehicle and of any major repairs to the vehicle. Most major repairs on a motor vehicle can be eliminated or delayed by proper attention to a relatively small number of items. Properly maintaining these items extends the period between major repairs as well as extends the vehicle life. Therefore it is important that the vehicle owner be aware of the need to service these items.

Generally, the important items need maintenance at different, independent intervals. For this reason, it is difficult for the owner to keep track of which item needs maintenance at which interval.

Additionally, the maintenance intervals vary depending upon the vehicle's actual use. For example, oil must be changed frequently when the vehicle is used only for short trips, while more miles are acceptable between oil changes if the vehicle is used only for long distance, highway driving. This variability of usage further complicates the problem of vehicle maintenance, because generally manufacturer maintenance recommendations are for only a single milage value, thereby creating many non-optimal maintenance situations. For these reasons, a number of types of maintenance interval monitors have been proposed.

For example, U.S. Pat. No. 4,031,363 involved an electronic monitor which indicated the need for vehicle maintenance after a fixed time interval or after a fixed distance interval. The distance traveled was determined from the speedometer cable or other mileage sensor. The monitor did not allow the intervals to be changed by the vehicle owner.

U.S. Pat. No. 4,159,531 relates to an electronic service indication system. When queried, the system indicated the next mileage at which maintenance should be performed and the names of the tasks to be performed. The suggested mileages between tasks was not alterable by the user and there was no prompting to indicate when service was to be performed. The system also allowed storage of the actual mileages at which service was performed by the proper facility, but required special equipment to record the values.

In U.S. Pat. No. 4,307,291, a mechanical maintenance monitor with a series of rotatable wheels was driven by the vehicle's speedometer cable. An electrical circuit closed to indicate the set interval completion. A number of different intervals corresponding to different tasks could be set by the manufacturer, but the maintenance intervals were not adjustable by the owner.

U.S. Pat. No. 4,404,641 disclosed an electronic equipment maintenance monitor which compared elapsed running time with owner selectable time values to enable warning indicators and equipment disabling devices.

U.S. Pat. No. 4,739,482 disclosed an improved motor vehicle maintenance interval monitor which had three connections to the electrical system of the vehicle. One connection was to ground, one was to a positive voltage which was present at all times and the third connection was to a positive voltage present only when the vehicle was running. The monitor determined the running time of the vehicle and multiplied this by an assigned, estimated vehicle speed, so that an estimated distance was determined. This distance was subtracted from various maintenance item intervals to result in a countdown to zero, indicating that maintenance was due on that item. An alarm was employed when maintenance was required. Several maintenance items could be separately tracked.

One of the common problems of the above-mentioned prior art monitors was that they had to be installed in a vehicle by persons having electrical or wiring skills and mechanical assembly skills. This problem eliminated from consideration any monitors requiring electrical connections or mechanical connections to the vehicle speedometer cable. Because mileage is the common standard used to determine maintenance requirements, only monitors using miles for the service interval were really effective. This made undesirable monitors which measured only elapsed time. Most monitors had maintenance intervals settable only by the monitor manufacturer, which made them undesirable if the owner desired different maintenance intervals.

SUMMARY OF THE INVENTION

Briefly, the present invention provides a new and improved programmable motor vehicle maintenance interval monitor. The monitor is computer-based and has no electrical connections to the vehicle and optionally no mechanical connection to the vehicle. The monitor is battery powered and includes a timer maintaining and advancing the date and time. The timer is continuously running, preferably being interrogated by the computer at regular intervals to determine the current date and time.

The monitor can display six maintenance requirements and the mileage remaining until each requirement needs service. Alternately, the monitor can display the date and time, with the maintenance requirements and remaining mileage values available by pressing a button or appearing periodically. When the remaining mileage for a maintenance requirement passes zero, a warning device, such as a beeper, sounds periodically and the particular maintenance requirement is displayed, indicating the need to service that maintenance requirement. After the service has been performed, the owner enters the desired number of miles before that requirement is to be next serviced, thus resetting the warning or alarm function. Additionally, the owner can change the remaining mileage in any category at any time to allow for changes in vehicle use or provide for early maintenance.

The elapsed mileage the vehicle has traveled is calculated from the date and time as maintained by the timer. The monitor determines the elapsed time since the last mileage calculation was performed and multiplies this time by a speed factor to estimate the distance traveled since the last mileage calculation. The mileage calculations are done on a frequent basis to minimize starting and ending errors. The speed factor can be changed to suit the individual conditions. The owner periodically enters the current vehicle mileage. The computer then uses this mileage, the mileage which was last entered by the owner and the elapsed time between the two entries to determine a new speed factor used in the mileage estimation calculations.

Because the estimated mileage is developed from the speed factor and the passage of time, no electrical connections are necessary to the vehicle. Indeed, no mechanical connections are necessary, so the monitor can be a self-contained, portable unit.

BRIEF DESCRIPTION OF THE DRAWINGS

FIG. 1 is a schematic diagram of a computer system of the present invention.

FIG. 2 is a schematic diagram f the power supply for the computer system of FIG. 1.

DETAILED DESCRIPTION OF THE PREFERRED EMBODIMENT

Figure 3A:
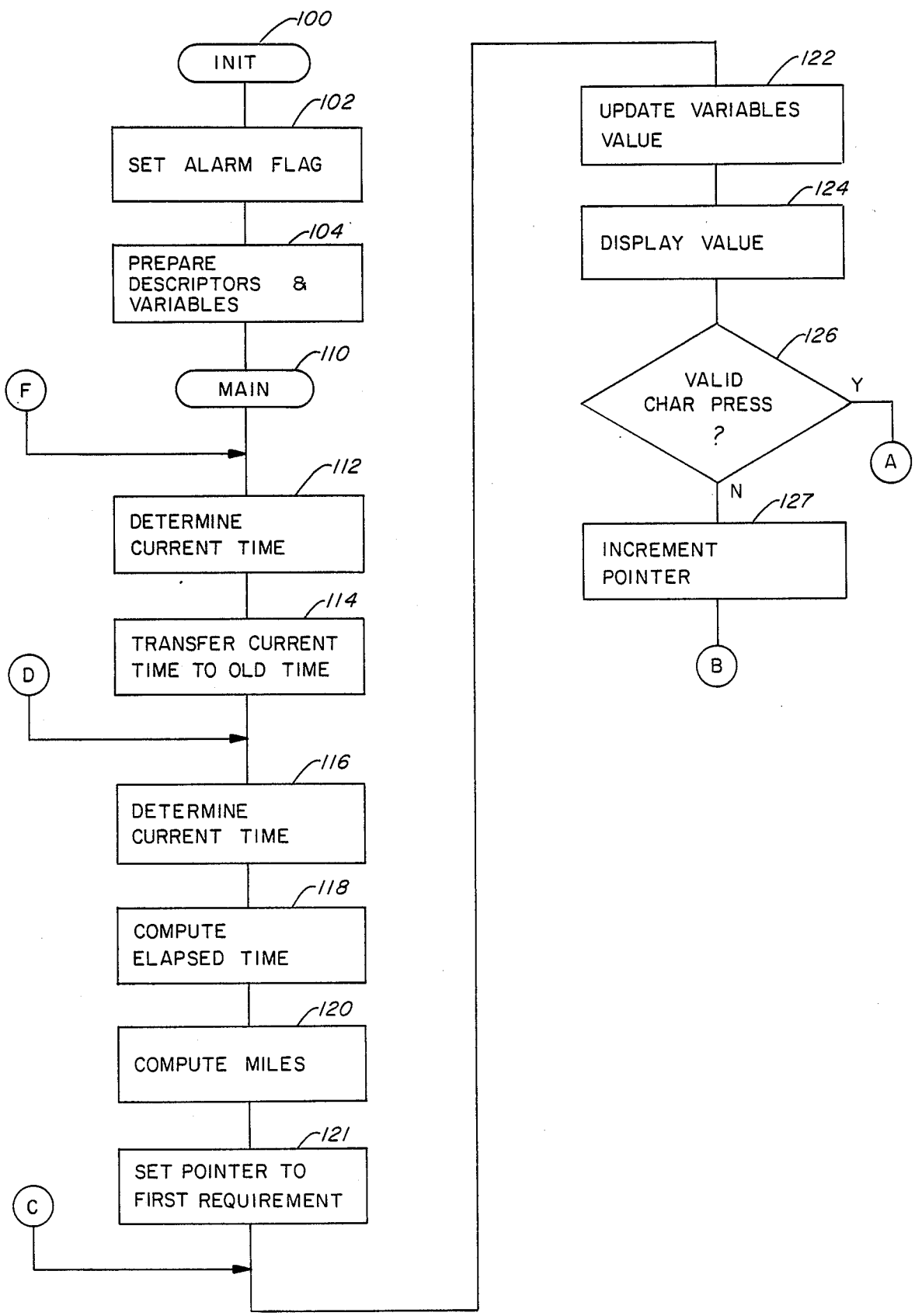
FIGS. 3A, 3B and 3C are flowchart illustrations of the initialization and main program sequences performed by the computer system of the present invention.

In the drawings, a monitor module M (FIG. 1), which includes a computer C is shown. The monitor module M of the present invention allows an operator of the vehicle or maintenance personnel to determine when any of a selected number of maintenance items or tasks are to be performed. As will be set forth, the monitor module M of the present invention permits a number, in the preferred embodiment six, of maintenance items with the same or different intervals to be separately monitored. Further, the individual intervals may be selectively varied as vehicle usage needs or experience varies.

In the computer C (FIG. 1), a central processor unit 50 having an address bus 52 and a data bus 54 is connected to random access memory 58; read-only memory 56; a display 62, through a display driver 60; and an input/output section 63. The input/output section 63 has an input/output controller 64 connected to a display mode switch 65, a timer 66, a beeper or other suitable alarm 67 and a keyboard matrix 68.

The timer 66 contains a free running timer which functions as a computer real time clock for the computer C. The processor 50 accesses the timer 66 to determine the day, hour, minute and second of the current time to allow the computer C to keep track of elapsed time.

The keyboard matrix 68 may be any of several commercially available computer data entry keyboards. The keyboard 68 is used to enter the new mileage intervals for the various items stored in the monitor, query the monitor for the date and time and particular item mileage values and set the date, time and current mileage values.

The display 62 shows the vehicle operator or maintenance personnel the information as desired by the position of the display mode switch 65. The display mode switch 65 is preferably a three position switch for indicating three different display modes. The first mode continuously displays the various maintenance requirement descriptors and the remaining mileage for that requirement. The second mode generally displays the current date and time, with the maintenance requirement descriptors and remaining mileages displayed when a specific button is depressed on the keyboard 68. The third mode generally displays the current date and time, but the maintenance requirement descriptors and mileages are periodically displayed, so that the information displayed alternates between the date and time and maintenance information. The display 62 additionally allows confirmation of the keyboard buttons pressed while entering new information because the information for processor 50 obtained through input/output unit 64 is presented on data bus 54 to display driver 60. The display 62 is preferably a liquid crystal display to preserve battery life and reduce system power requirements. The alarm 67 is accessible to the central processing unit 50 of computer C through input/output unit 64. In the preferred embodiment, the alarm 67 is a beeper which provides an audible warning when the established interval for a maintenance item has elapsed.

The electrical energy used to power the computer C and the module M is provided by a battery 30 (FIG. 2). The battery 30 is sized to provide sufficient voltage and current to power the module M for a satisfactory period of time and to allow the computer C to be built from conventional devices. A capacitor 32 is preferably placed in parallel with the battery 30 to provide power during the interval the battery 30 is removed when the battery 30 is being changed. This continuous power supply allows the various values such as the maintenance requirement values, the date and time and other values, to be retained during battery replacement.

The computer C operates on a stored series of control instructions in the form of a computer program, the steps of which are shown schematically in FIGS. 3A, 3B, 3C, 4A and 4B. When the monitor is first activated, an initialization sequence 100 (FIG. ma) is performed to clear all data storage registers. The first step of the sequence 100 is step 102, where an alarm flag is set to indicate that the alarm function is enabled. Step 104 then prepares the various requirement descriptors and initial values used in connection with the various maintenance requirements and display modes. The descriptors are, for example, the names of the maintenance requirements to be monitored, and are displayed in conjunction with the item's mileage value during monitor operation to ease owner understanding of the displayed information. For example, the maintenance requirements to be monitored in the preferred embodiment are oil change, tire rotation, spark plug change, transmission fluid change, belt replacement, and brake maintenance. The descriptors and maintenance interval values in miles are accordingly OIL, 2000; ROTATE, 7000; PLUGS, 10000; TRANS, 20000; BELTS, 25000; and BRAKES, 35000. A seventh item initialized is a speed or usage factor, referred to as SPEED, with a value of 1.37 mph, which is effectively equivalent to the vehicle being driven at that average speed over approximately 12,000 miles during a twenty-four hour, three hundred sixty-five day year. This value is used in conjunction with the elapsed time to determine the estimated miles the vehicle has traveled. An eighth value initialized is an alternate counter used to control the period the date and time are displayed in the alternating display mode. Ninth and tenth items initialized are the last mileage value and the last mileage date and time. These values are set at zero. After completing the initialization step 104, control is transferred to the main program sequence 110.

The main program sequence 110 is the main control loop of the program. The sequence 110 commences at step 112 where the current time is determined by reading the timer 66. Step 114 follows and the old time is made equal to the current time. This is done so that errors do not occur because of a randomly generated initial old time. After step 114 is completed, step 116 determines the current time so that two times are available for calculation purposes.

Step 118 computes the elapsed time by subtracting the old time from the new time. This value is then used in step 120 where it is multiplied by the speed factor to determine an estimated distance traveled during the elapsed interval. The estimated mileage may be incorrect for any single interval, but by properly choosing the speed factor, the errors average out over a longer period of time and the total miles traveled as indicated by this indirect method is sufficiently close to the actual miles traveled.

Step 121 then sets a pointer to indicate the first of the six maintenance requirements. Step 122 then subtracts the estimated distance from the remaining mileage value of the requirement indicated by the pointer. This decrements the mileage value from either the initially preset value or an owner entered value so that when the value reaches zero or becomes negative, service is due on that item. After the updating of the requirement value is completed, the requirement may be displayed in step 124 by using the display value subroutine 200 (FIGS. 4A and 4B), depending on the display mode selected.

When the display subroutine 200 is completed, control returns to step 126, a decisional step. Step 126 determines if a valid character on the keyboard has been pressed. In the preferred embodiment, valid characters at this step are any non-control characters. If a valid character has not been pressed, control proceeds to step 127 where the pointer is incremented to point to the next maintenance requirement. Following this, step 128 (FIG. 3B) provides a delay loop. This delay loop is provided so that the maintenance requirements are not displayed too quickly and so that sufficient accumulated time elapses between the mileage computations of step 120 so that the computer C can use simpler arithmetic functions because of the lower precision required. For example, if the computation was performed on one second intervals and the speed rate was 1.37 mph, the computed mileage per interval would be approximately 0.0004 miles, while if the computation was performed on two minute intervals, the computed mileage would be approximately 0.46 miles. The larger value in the second instance allows lower precision arithmetic operations to be performed, simplifying the program and hardware requirements of the monitor module M.

After the delay loop step 128 is completed, step 130 determines if the last requirement has been completed. Only the six maintenance requirements are updated and available for display in this cyclic manner. The seventh item, the speed factor, is not displayed at this time because it is a constant and is not an item requiring servicing. The eighth, ninth and tenth items are values used by the computer C and are not relevant to servicing.

If step 130 determines that the last requirement has not been updated and displayed control transfers to step 122 and the next requirement is processed. If the final requirement has been displayed, control transfers to step 132 where the current time is renamed to be the old time and control transfers to step 116 (FIG. 3A) to begin a new calculation cycle.

Figure 3B:
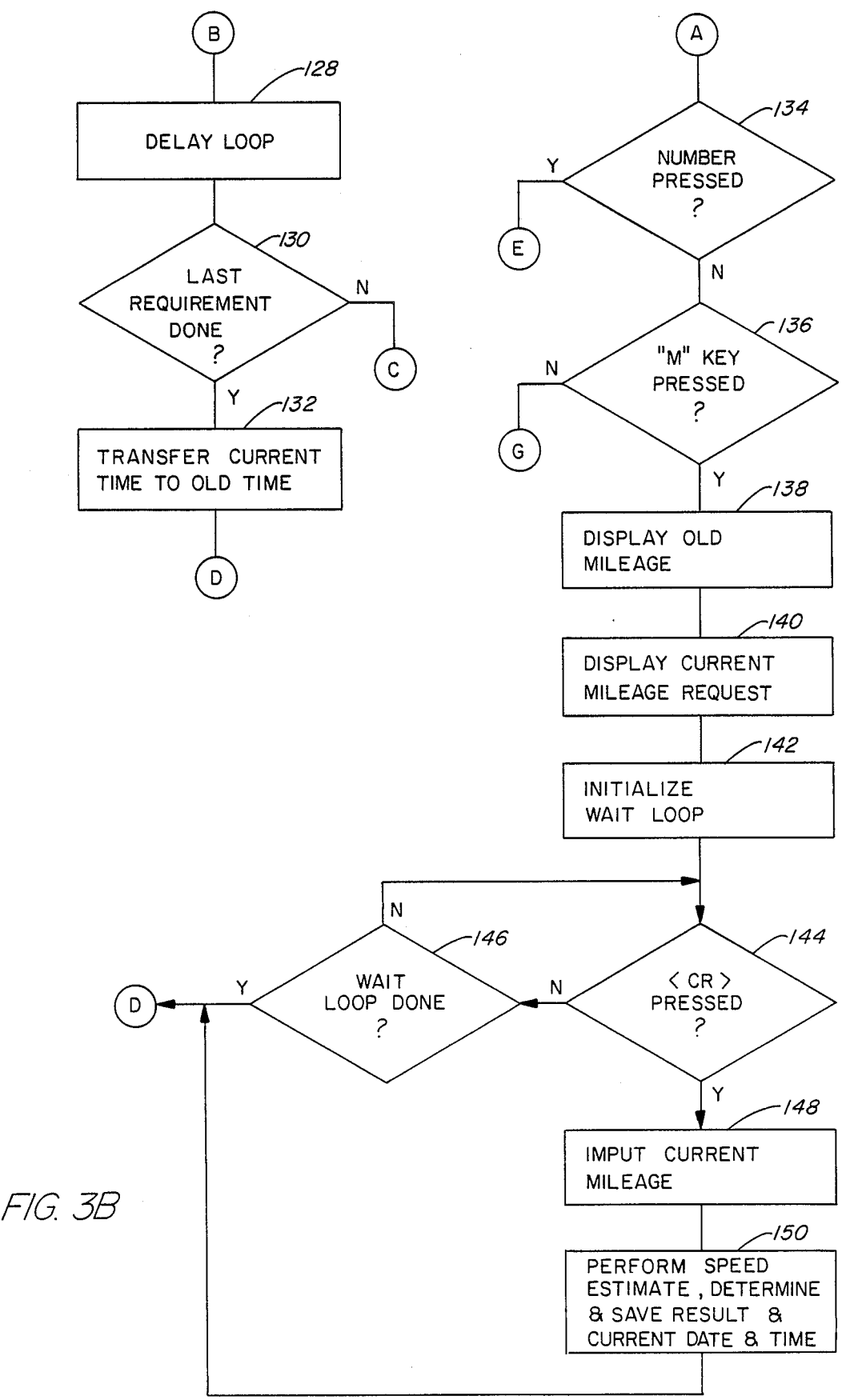
Figure 3C:
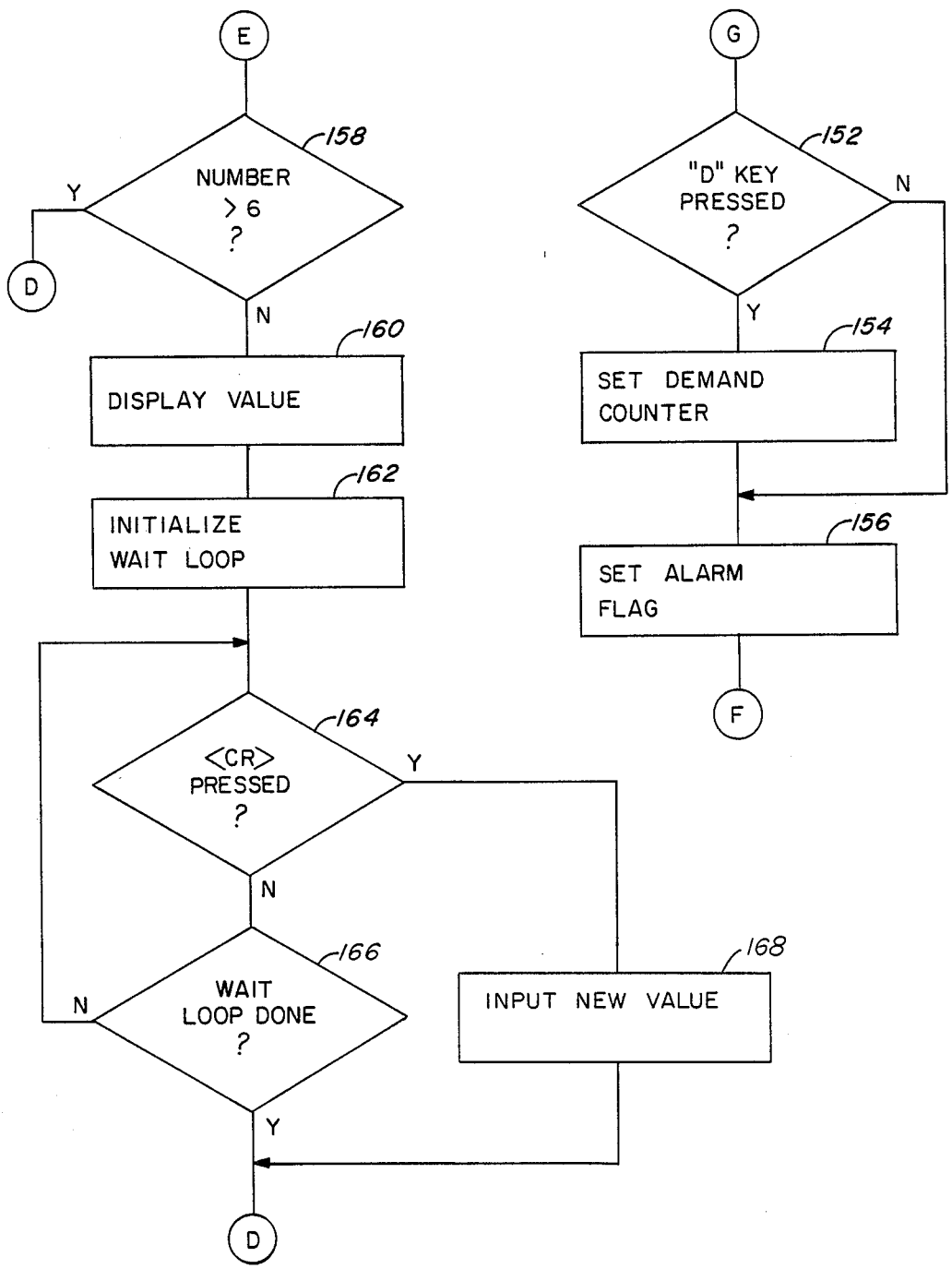
Figure 4A:
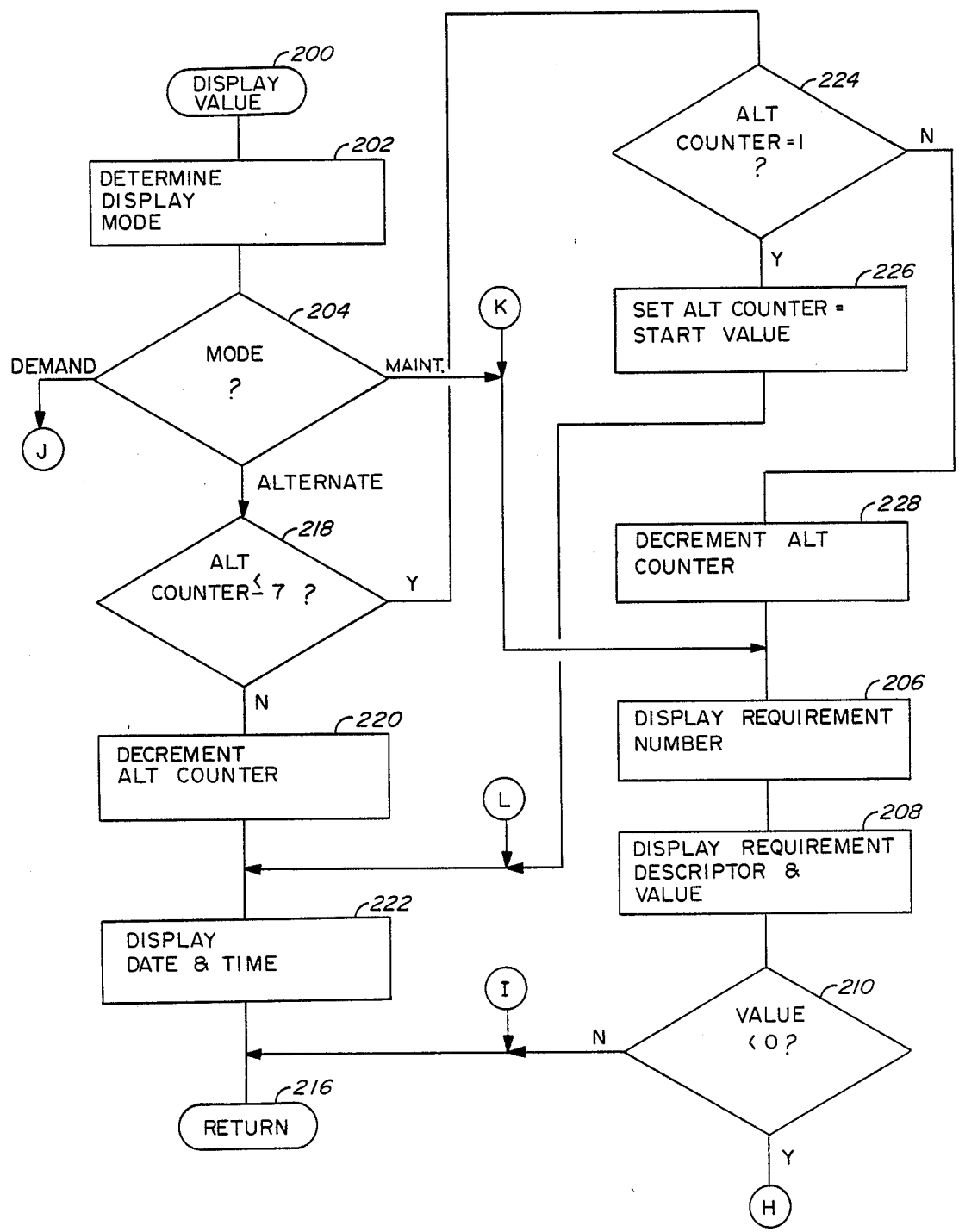
FIGS. 4A and 4B are flowchart illustrations of the display subroutine sequence performed by the computer system of the present invention.
Figure 4B:
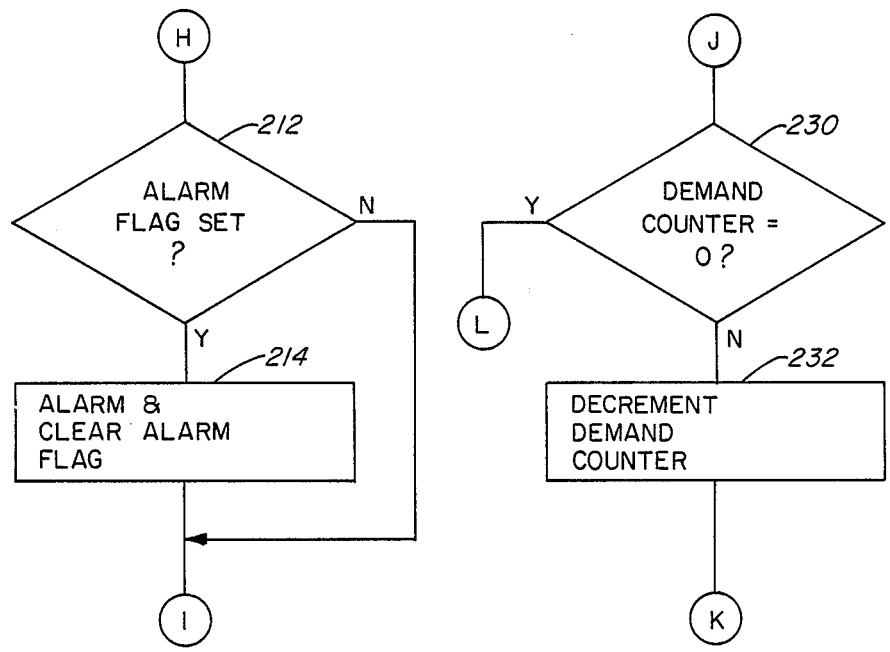

If step 126 determines that a valid character has been depressed, control transfers to step 134 (FIG. 3B). Step 134 determines if a number was pressed. If a number key was not depressed, step 136 determines if the M key was pressed. The M key is used to indicate that a new mileage value is to be entered and a new speed factor determined. If the M key was pressed, step 138 displays the last mileage value contained in the monitor M. Step 140 then displays a request for the new or current vehicle mileage. Step 142 initializes a wait loop so that if no response is made by the owner within a given time the entry of a current mileage is aborted and sequencing continues. Step 144 determines if the carriage return button has pressed indicating that a mileage entry is desired. If no button has been pressed, control proceeds to step 146 which determines if the wait loop is completed. If the wait time is not completed, control returns to step 144, while if the wait time is elapsed, control proceeds to step 116 and a mileage computation sequence is started.

If the carriage return button was pressed, step 144 transfers control to step 148, where the current mileage is received from the owner. After the current mileage is determined, step 150 subtracts the previously entered mileage from the current mileage to determine a miles traveled value. The date and time of the previous mileage entry is subtracted from the current date and time to determine the elapsed time. The miles traveled value is divided by the elapsed time and a new speed factor value is obtained. This new speed factor, the current mileage and the current date and time are stored for use in future calculations. The ability to have the monitor module M determine an estimated speed factor by entering the current mileage allows the speed factor to be changed to better suit the operator's driving routine.

If the previously entered mileage and the previous mileage date and time are zeroes, this indicates that this is the initial entry of mileage information and the speed factor is not changed, but the mileage, date and time are stored for future use. After the values have been stored, control returns to step 116 to begin a mileage computation sequence using a new speed factor.

If step 136 determined that the M key was not pressed, step 152 (FIG. 3C) determines if the D key was pressed. The D key is used to request a display of the maintenance requirements on demand, when the display mode is in the demand state. If the D key was pressed, step 154 sets the demand counter value so that the maintenance requirements are displayed if the mode selection switch 65 is in the demand mode position. If the D key was not pressed or after the demand counter has been set, step 156 sets the alarm flag to enable the warning and indication function. This causes the alarm 67 to be activated every time a valid, non-number key is depressed. After setting the alarm flag, control is passed to step 112 to restart the main sequence 110.

If a valid character other than a number or the M key was depressed and the last requirement was not being displayed, the remaining requirements will not be updated. This causes a very minor error in the amount of accumulated miles for these requirements. It does not however affect the overall monitor accuracy because generally each main loop routine is performed in a time in which the vehicle is considered to travel only a fraction of a mile.

If step 134 determined that a number key had been depressed, control transfers to step 158 (FIG. 3C) which determines if the number was greater than seven. If so, control returns to step 116. In this case several requirements may be updated twice, but again, one erroneous loop does not practically affect the cumulative accuracy of the monitor M.

If step 158 determined that the number was six or less, step 160 displays the requirement corresponding to the depressed number. This path is used to examine and optionally change the remaining mileage value of a particular maintenance requirement. After the requirement is displayed, control proceeds to step 162 where a wait loop is initialized. Next, step 164 determines if a carriage return has been entered on the keyboard. If not, control passes to step 166 which determines whether the wait loop has finished. If not, control returns to step 164, forming a loop. This loop allows the owner a period of time to determine if this is the proper requirement to be changed and so indicate by pressing the carriage return key. If the wait loop is finished, control proceeds to step 116, allowing the program to continue if the wrong requirement had been selected.

If step 164 determined that a carriage return had been entered, step 168 allows the new value for the selected maintenance requirement to be entered from the keyboard 68 and displayed on the display 62. After the new value is entered, control returns to step 116 of the main loop (FIG. 3A).

In this manner the owner can change any of the values as desired and when desired. This allows new intervals to be reset after the maintenance has been performed and allows the owner to set the service intervals at individually desired mileages, not mileages suggested by the manufacturer. This enables the vehicle operator or maintenance personnel to better match the service intervals with their preferences and driving style and habits.

If the distance traveled by a vehicle having a monitor module M with a speed factor adjusted for shorter distances in a given interval is increased, the actual mileage of the vehicle will not correspond to the estimated mileage determined by the monitor M, but this is an acceptable result. The maintenance intervals for many higher mileage situations are generally longer because of the lower stress imparted and so the apparent miscalculation is actually a better approximation of the need for maintenance than if the mileage estimation was actually accurate and the maintenance interval or speed factor not changed. The same logic applies to the higher speed factor vehicle whose distance traveled is reduced. The monitor determined mileage is greater than the actual mileage, but more accurately reflects the vehicle stress levels during the intervals. These conditions assume that the speed factor is approximately correct based on the normal usage of the vehicle. If the different trips are not irregular, but become more frequent, the speed factor and maintenance intervals should, of course, be changed to reflect the change in vehicle usage.

The display value subroutine 200 (FIG. 4A) performs the tasks of determining the display mode, displaying the values for the appropriate requirement and sounding the alarm 67 as appropriate. The first step in the subroutine 200 after entry is step 202 where the display mode is determined. In the preferred embodiment three display modes are available. The first mode displays the maintenance requirements at all times. The second mode displays the date and time and the maintenance requirements in an alternating sequence, where the date and time are displayed for a predetermined period, following which the maintenance requirements are displayed. After completing the maintenance requirements display, the sequence is restarted and the date and time are displayed. The third mode displays the maintenance requirements only after a specified key is pressed, with the displayed information otherwise being the date and time.

In step 204 the display mode is analyzed and control is passed as appropriate. If the selected display mode is the maintenance requirements only mode, control proceeds to step 206 where the requirement's number is displayed for a period of time. This is done to allow correlation between the requirement's numerical and descriptor representations. After the requirement number has been displayed, step 208 displays the maintenance requirement descriptor and the remaining mileage value for that requirement. Next, step 210 determines if the value is less than zero, which indicates that the requirement should be serviced. If this is the case, control proceeds to step 212 (FIG. 4B) which determines if the alarm flag is set. If so, step 214 activates the alarm for a period of time to alert the owner and then clears the alarm flag. This clearing is done because it is desired that the alarm be active only the first time after being enabled and not every time the particular requirement is displayed to conserve battery life. After clearing the flag, control proceeds to step 216, the return to the calling step in routine 100.

If the mileage was zero or positive in step 210 or the alarm flag was cleared in step 212, control passes to step 216 and control returns to the calling routine.

If step 204 determined that the alternate display mode was selected, control proceeds to step 218 which determines if the value of a variable called ALT COUNTER is checked. If the value of ALT COUNTER is not less than or equal to 7, indicating that it is not time to display the maintenance requirements, control proceeds to step 220 where the ALT COUNTER value is decremented. The current date and time are then displayed in step 222 and control passes to step 216, which causes a return to the calling step.

If step 218 determined that the ALT COUNTER value was less than or equal to 7, control proceeds to step 224 where the ALT COUNTER value is compared to one If the ALT COUNTER value is one, step 226 resets the ALT COUNTER value to a starting value. This starting value is selected based on the percentage of time the date and time are to be displayed. If the date and time are to be displayed one-half the time, then the starting value is 12. If the date and time are to be displayed for approximately 75% of the time, the starting value is 24. If only five maintenance requirements were being displayed, step 218 would compare against the value 6 and a 75% date and time display would have a starting value of 20. After the ALT COUNTER value has been changed in step 226, the current date and time are displayed in step 222 and control proceeds as previously described.

If step 224 determined that the ALT COUNTER value was not equal to one, control proceeds to step 228 where the ALT COUNTER value is decremented. Step 206 then displays the maintenance requirement that was last updated in the main routine 100, and control proceeds as previously described.

If step 204 determined that the demand mode was desired, control proceeds to step 230 where the variable DEMAND COUNTER is compared to zero. As previously described, the DEMAND COUNTER value is set in step 154 after it has been determined that the D key was pressed. If the DEMAND COUNTER value is zero, all the maintenance requirements have been displayed and control proceeds to step 222 where the current date and time are displayed.

If step 230 determined that the DEMAND COUNTER value was not zero, step 232 decrements the DEMAND COUNTER value by one and passes control to step 206 where a maintenance requirement number is displayed.

The embodiment described above displays each maintenance requirement during the cyclic display operation period. If the number of maintenance requirements exceeds a larger number than six, it may be preferable that not all the requirements be displayed. This is because viewing the entire series would require a large amount of time and might require that the owner wait a long period to see a particular requirement of concern, especially those nearing service time. To this end, in an alternate embodiment only the three requirements closest to the end of their maintenance intervals are displayed. This makes it easier to monitor requirements nearing service.

The mileage value for all requirements is first calculated, with the lowest three being noted during the update calculations. After completing the update, the three noted requirements are displayed. After displaying the requirements, the computer C then determines if a valid key has been pressed. A review of all the requirements is obtained by pressing a designated key on the keyboard 68, causing the computer C to perform a different subroutine to display all maintenance requirements.

As can be seen from the above description, the present monitor is very easy to install and yet is a very flexible system, working quite well under normal conditions. No electrical connections are necessary because the monitor module M does not actually determine actual vehicle mileage or vehicle running status, but estimates these values. Indeed, because the monitor module M does not require even a mechanical connection to the vehicle, the monitor module M can even be located in any convenient place where the monitor module M can be frequently monitored, such as a garage or a kitchen occupied by the vehicle owner.

The foregoing disclosure and description of the invention are illustrative and explanatory thereof, and various changes in the size, shape and materials, as well as in the details of the illustrated construction and logic flow may be made without departing from the spirit of the invention.

I claim:

1. A vehicle maintenance interval monitor, comprising:
   means for storing a plurality of maintenance intervals for the vehicle;
   means for setting each of the plurality of maintenance intervals for the vehicle;
   means for storing an estimated vehicle speed value;
   means for setting the estimated vehicle speed value;
   means for determining the actual date and time;
   means for storing an actual date and time as a stored date and time;
   means for retrieving the stored date and time, for obtaining an actual date and time from the date and time determining means, and for determining a change in the actual date and time by subtracting the retrieved stored date and time from the obtained actual date and time;
   means for retrieving the stored estimated vehicle speed value, for obtaining the determined change in the actual date and time, and for calculating an estimated distance traveled by multiplying the determined change in the actual date and time by the stored estimated vehicle speed value;
   means for retrieving each of the maintenance intervals, for obtaining the estimated distance traveled, and for comparing the estimated distance traveled with each of the maintenance intervals; and
   means responsive to the maintenance interval comparison means for indicating when the estimated distance traveled has exceeded one of the maintenance intervals,
      wherein the date and time determining means, the date and time storing means, the date and time change determining means, the estimated distance traveled means, the comparing means and the indicating means are active independent of the vehicle running or moving status.

2. The monitor of claim 1, further comprising:
   means for changing one of the maintenance intervals.

3. The monitor of claim 1, further comprising:
   means for changing the estimated vehicle speed value.

4. The monitor of claim 3, further comprising:
   means for changing one of the maintenance intervals.

5. The monitor of claim 3, wherein the means for changing the estimated vehicle speed value includes:
   means for determining a first vehicle mileage value;
   means for determining a second vehicle mileage value;
   means for determining the change in actual date and time between the determinations of the first and second vehicle mileage values;
   means for subtracting the first vehicle mileage value from the second vehicle mileage value to obtain a miles traveled value; and
   means for dividing the miles traveled value by the change in actual time between the first and second vehicle mileage value determinations to obtain the new estimated vehicle speed value.

6. The monitor of claim 1, wherein said changed actual date and time are determined in a plurality of intervals, said distance traveled is calculated for each time interval resulting in distance intervals and said comparison is performed on the cumulation of said distance intervals.

7. The monitor of claim 1, further comprising:
   means for displaying each of the maintenance intervals.

8. The monitor of claim 1, further comprising:
   means for displaying the date and time.

9. The monitor of claim 8, further comprising:
   means for displaying each of the maintenance intervals.

10. The monitor of claim 9, wherein said means for displaying the date and time and said means for displaying the maintenance intervals utilize a common display and said display alternately displays the date and time and the maintenance intervals.

11. The monitor of claim 1, wherein said indication means comprises an audible alarm.

12. The monitor of claim 1, wherein said indication means comprises a means for forming a visual signal.

13. A method of monitoring motor vehicle maintenance intervals using a computer system having a plurality of data storage locations, capable of performing arithmetic and logical operations, having an indication of the actual date and time, and having an indication to alert the user, the method comprising the steps of:

establishing and setting a plurality of maintenance intervals in the data storage locations;

establishing and setting an estimated vehicle speed value in the data storage locations;

determining an actual date and time;

storing an actual date and time as a stored date and time in the data storage locations;

determining a change in the actual date and time by subtracting the stored date and time from the actual date and time;

calculating an estimated distance traveled by multiplying the determined change in the actual date and time by the estimated vehicle speed value;

comparing the calculated estimated distance with each of the established maintenance intervals; and indicating when the calculated estimated distance traveled has exceeded one of the established maintenance intervals, the steps of the method including and following the determining an actual date and time being performed independent of the vehicle running or moving status.

14. The method of claim 13, further comprising the step of:

changing one of the established maintenance intervals.

15. The method of claim 13, further comprising the step of:

changing the estimated vehicle speed value.

16. The method of claim 15, further comprising the step of:

changing one of the established maintenance intervals.

17. The method of claim 15, wherein the step of changing the estimated vehicle speed value includes the steps of:

determining a first vehicle mileage value;

determining a second vehicle mileage value;

determining the change in actual date and time between the determinations of the first and second vehicle mileage values;

subtracting the first vehicle mileage value from the second vehicle mileage value to obtain a miles traveled value; and dividing the miles traveled value by the change in actual time between the first and second vehicle mileage value determinations to obtain the new estimated vehicle speed value.

18. The method of claim 13, wherein:

said steps of determining the change in the actual date and time, calculating an estimated distance, and comparing are continuously performed.

* * * * *